C. P. HASSELGREN.
FLYTRAP.
APPLICATION FILED APR. 27, 1920.
1,369,242.
Patented Feb. 22, 1921.
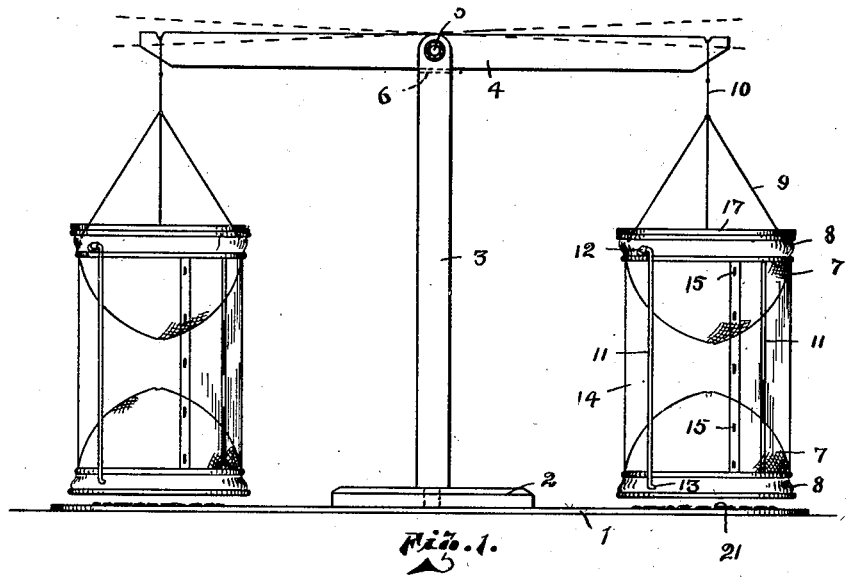
Fig. 1.
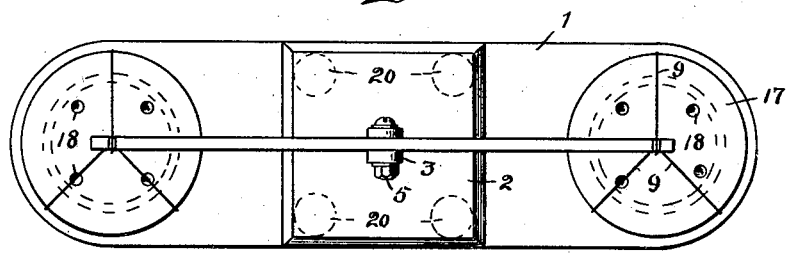
Fig. 2.
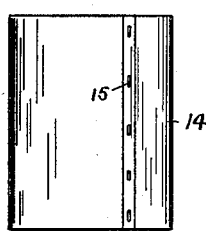
Fig. 3.
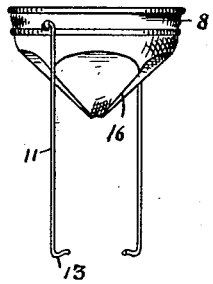
Fig. 4.
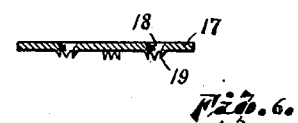
Fig. 5.
Fig. 6.
INVENTOR
Carl P. Hasselgren
BY Geo. Stevens
ATTORNEY

UNITED STATES PATENT OFFICE.

CARL P. HASSELGREN, OF SUPERIOR, WISCONSIN.

FLYTRAP.

1,369,242.   Specification of Letters Patent.   Patented Feb. 22, 1921.

Application filed April 27, 1920. Serial No. 376,927.

*To all whom it may concern:*

Be it known that I, CARL P. HASSELGREN, a citizen of the United States, residing at Superior, in the county of Douglas and State of Wisconsin, have invented certain new and useful Improvements in Flytraps, of which the following is a specification, reference being had therein to the accompanying drawing.

This invention relates to fly traps and has special reference to a device of this character particularly designed for use on a table, counter, or like flat surface where flies are wont to congregate and become annoying.

The principal object of the invention is to produce an efficient fly trap. Another object is to produce a fly trap of this type which is sanitary and convenient of access for cleaning purposes. Still another object is to produce such a trap in which intermittent manual attention will conduce to the efficiency thereof. Other objects and advantages of the specific structure will appear in the further description of the invention.

Referring to the accompanying drawings forming part of this application in which like reference characters indicate like parts:

Figure 1 is a side elevation of my improved fly trap;

Fig. 2 is a top plan view of the same;

Fig. 3 is an elevation of one of the transparent cylinders of the trap removed therefrom;

Fig. 4 is a side elevation of one of the wire cones and its accompanying attachment showing a modified shaping of the cone;

Fig. 5 is an end view of one of the wire cones as shown in Fig. 4; and

Fig. 6 is a diametrical sectional view through the cover of the trap.

1 represents a thin flat platform such as of heavy paper or the like upon which and centrally thereof is mounted the base 2 of the fly trap pedestal, the upright of which is shown at 3 with a cross-arm or walking beam 4 pivotally mounted as at 5 in the upper end thereof. The three last mentioned portions of the pedestal I prefer to construct of wood, both for simplicity and inexpensiveness of construction, and, when it is knocked down, the upright 3 is removed from the base 2 in which it tightly fits and the walking beam or cross-arm 4 is held normally intermediate of the bifurcated end of the upright 3 sufficiently tight, by the bolt 5, to prevent its movement either up or down except by considerable manual pressure and the limit of its rocking movement is predetermined by the depth of the notch in the upper end of the upright 3, which is but slightly deeper than the thickness of the arm as indicted at 6, so that when one end or the other of the arm 4 is depressed manually, the extent of the depression will not materially exceed that which is necessary to allow one of the traps which are suspended upon the ends of the cross-arm to remain by gravity upon that portion of the platform 1 therebeneath.

The traps which are suspended from the ends of the walking beam or arm 4 are exactly alike in construction and comprise two vertically opposed suspended wire net cones 7, such as are commonly used in the art, they each being rigidly fixed to an annular tin rim 8. The uppermost one of the cones is suspended by preferably three cords 9 being suitably fastened into the band 8 and suspended from a single cord 10 at the upper ends thereof which is looped over the end of the notched cross-arm 4. The lowermost one of the cones 7 is suspended from the uppermost cone by two wires 11 being pivotally attached to the band 8 of the uppermost cone as at 12 and hooked into suitable holes in the band 8 of the lowermost cone as at 13 and intermediate of the bands of the two cones and encircling the latter forming the cylindrical portion of the trap is the cylinder 14 made of sheet celluloid fastened together as at 15 by suitable clenching staples or other like means.

The traps, when in normal condition, are suspended just sufficiently far above the platform 1 to permit flies to enter intermediate of them and the platform as is usual in such devices.

The introduction of the manual manipulation of the device may occur as follows: When a number of flies have congregated beneath either one of the traps thus suspended, an observer may tap downwardly upon the end of the cross-beam 4 which supports the trap under which the larger number of flies are seen, when said trap will be instantly depressed by gravity to surround the flies and will there remain, when the flies thereunder thus imprisoned will soon work their way up into the trap. If the individual operating the same has not the time to abide for this purpose, the two traps may remain with one end on the platform and the other somewhat abnormally raised, when another passerby or the same individual interested in the trap may see a congregation of flies under the raised trap when he will again quickly tap the opposite end of the cross-arm and reverse the condition of the traps which will obviously result in his being a party to the efficiency thereof; or they may be allowed to remain each one spaced equally from the platform and continue to catch flies in the ordinary manner. From the above it appears why the joint intermediate of the cross-arm and the upright should be maintained with a certain degree of tightness to hold the traps in the position in which they are left, either one up and the other down, or both level as described.

Attention is directed to Figs. 4 and 5 of the drawings in which I have shown the wire cone 7 as being somewhat flattened upon four opposite sides which may be easily accomplished by forcefully drawing the fingers outwardly upon the cones and this I consider a material advantage in that ridges 16 are formed thereupon which are found to be of great assistance to the flies in determining their course of action and instead of going around and around in the cones, they will invariably, when encountering one of the ridges, proceed to follow it up to the exit hole and thus more quickly determine their state of imprisonment.

17 represents a cover for each of the fly traps which is removably held thereupon intermediate of the strings 9 and each cover has formed therein a plurality of holes 18, preferably 4 in number, which are made by forcing a sharpened instrument therethrough the covers being paper or such like material that will form a ragged edge about the hole upon the lower side thereof as indicated at 19. The ragged edge 19 thus forms an efficient barrier to the convenient return of the flies through the holes and assists in their determining to pass downwardly into the trap.

Any desired form of bait may be employed upon the under side of the cover 17 such as a smearing of syrup, jelly, or the like, which feature of the art has always been practised.

A still further novel feature of the invention is that of providing means in the way of spots of glue or mucilage indicated at 20 upon the platform 1 which is designed to be replaced by another of similar construction when the first one has become soiled or otherwise inefficient and upon these platforms is provided any convenient form of bait such as syrup or the like indicated at 21 which may be moistened from time to time or added to as desired, it being one plan in connection with the invention to provide one or more such platforms either with the sale of the trap or subsequently as desired.

Having thus described my invention, what I claim and desire to secure by Letters Patent, is:

1. A device of the character described comprising a plurality of alternately vertically adjustable cylindrical fly traps, said traps comprising a cylindrical transparent body portion, an inverted fly receiving cone for the upper end of the body portion, an apertured closure therefor, a similar fly receiving cone for the lower end of the body portion having no closure therefor, and adjustable means for coöperatively uniting the two cones and the body portion.

2. A fly trap of the character described comprising a transparent cylindrical body portion, an inverted fly receiving cone for the upper end of the body portion, an apertured closure therefor, a similar fly receiving cone for the lower end of the body portion having no closure therefor and adjustable means for coöperatively uniting the two cones and the body portion.

In testimony whereof I hereunto affix my signature in the presence of two witnesses.

CARL P. HASSELGREN.

Witnesses:
ELLEN THEORIN,
S. GEO. STEVENS.